Sept. 1, 1964 C. R. FAUBER ETAL 3,147,325
PROCESS FOR MAKING BONDING PULLEYS
Filed Nov. 28, 1960 3 Sheets-Sheet 1

INVENTORS
Carl R. Fauber
James A. Bernard
BY Carl A. Stickel
Their Attorney

United States Patent Office 3,147,325
Patented Sept. 1, 1964

1

3,147,325
PROCESS FOR MAKING BONDING PULLEYS
Carl R. Fauber, New Lebanon, and James A. Bernard, Dayton, Ohio, assignors to General Motors Corporation, Detroit, Mich., a corporation of Delaware
Filed Nov. 28, 1960, Ser. No. 72,177
4 Claims. (Cl. 264—260)

This invention is directed generally to a process for making various articles such as pulleys, gears, disks and plates by joining endless rings or bands with intervening plastic material.

It is often desired to join elements of concentric rings or endless bands bonded together by a material of different heat, electrical, magnetic or sound carrying characteristics. Usually the intervening material must have heat, electrical, magnetic, sound or vibration insulating characteristics. Often high strength, high coefficient of friction, long life, and low cost are added requirements.

It is an object of this invention to provide an inexpensive fast, simple process for bonding concentric rings and/or endless bands together by a dissimilar material.

It is another object of this invention to provide an inexpensive fast simple process employing concurring heat and pressure for flowing and bonding the plastic material in between inner and outer rings and/or bands.

It is another object of this invention to employ heat and pressure for flowing and bonding plastic material in between inner and outer intermediate rings and/or bands.

It is another object of this invention to provide an inexpensive, fast, simple process for making magnetic clutches and/or gears.

It is another object of this invention to provide an improved magnetic clutch pulley or gear.

These and other objects are attained in the form shown in the drawing in which inner and outer and intermediate rings are held in proper concentric spaced relation by fixtures within a combined induction heating coil and hydraulic press. Two preformed rings of plastic resin material are assembled in between the rings. The plastic ring adjacent the intermediate ring preferably contains a scouring material while the other plastic ring contains metal particles or chips preferably of nonmagnetic material for providing good heat conduction. The other rings are preferably of steel having good magnetic properties.

The fixtures are arranged so that the bottom fixture holds the rings in concentric relationship while the next fixture above has a downwardly extending annular projection fitting between the inner and outer rings and pressing onto the upper surface of the second plastic ring. This second fixture in its upper portion also supports a second set of inner, outer, intermediate and plastic rings. This stacking arrangement is continued until five assemblies and rings are stacked together; then placed into a single turn split type induction heating coil, located in a hydraulic press.

The stacked assembly of rings and fixtures is first induction heated without pressure for about twenty seconds. For the second step, this heat is allowed to penetrate and soak into the plastic rings without any application of heat or pressure for about twenty seconds. In the third step, a pressure of fifty-five tons is applied to the stack and the induction coil is energized for one and one half minutes. In the fourth step, the heating is discontinued but the pressure is held for another two and one third minutes after which the stack assembly is removed and disassembled.

Generically my process is directed to the application of concurrent heat and pressure to one or more plastic members located between two or more endless bands.

Further objects and advantages of the present invention will be apparent from the following description, reference being had to the accompanying drawings, wherein preferred embodiments of the present invention are clearly shown.

Figure 1:
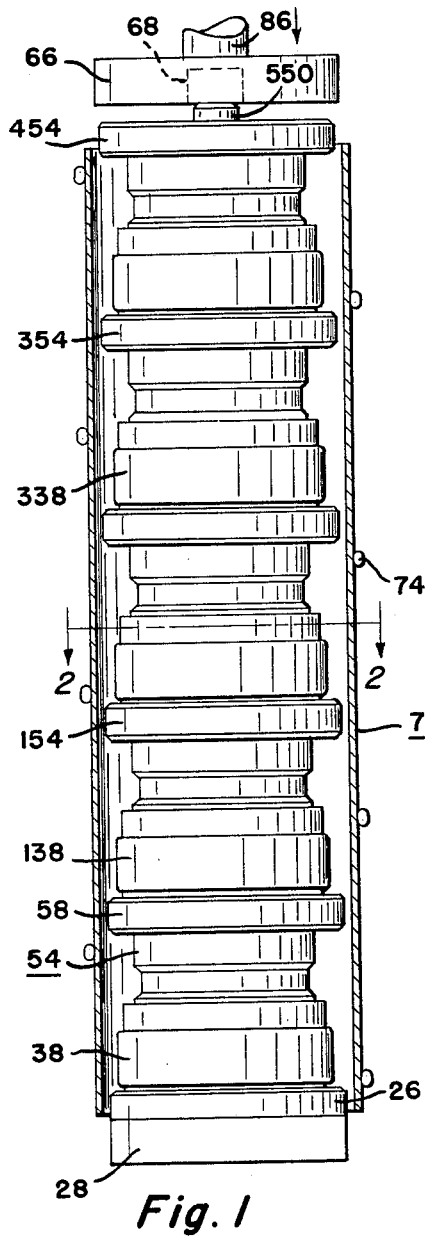
FIGURE 1 is a view in elevation of the stacked rings and fixtures located in a welding press embodying one form of my invention.
Figure 5:
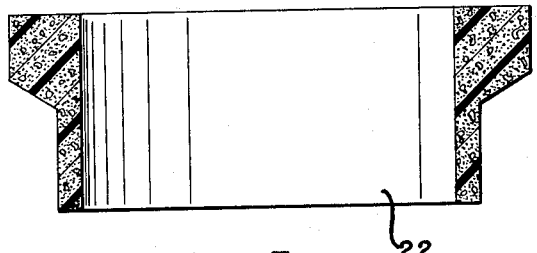
FIGURE 5 is an enlarged vertical sectional view through the upper plastic ring member.
Figure 6:
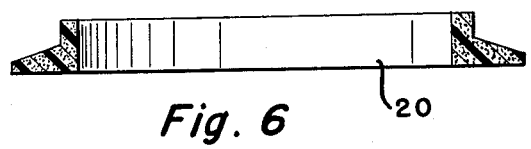
FIGURE 6 is a vertical sectional view enlarged through the lower plastic ring member.

As one specific example of the invention, there is shown in FIGURE 6 a ring 20 of plastic. This ring in one formulation may be formed of about three percent by weight of aluminum oxide, fifty-three to fifty-six percent by weight asbestos fibers and forty-four to forty-one percent phenolic (phenol-formaldehyde) resin. This material is thoroughly mixed and formed at room temperature into the shape disclosed in FIGURE 6 by an extremely high hydraulic load such as forty tons. A second ring of plastic material shown in FIGURE 5 is also provided. This ring 22 is for example formed of thirty-six to thirty-nine percent asbestos fibers, thirty to twenty-seven percent phenolic (phenol formaldehyde) resin and about thirty-four percent by weight of aluminum chips. In the making of the pulley, an intermediate interpole ring 24 is first placed upon the bottom member 26 of the fixture which rests upon the bottom plate 28 of a welding press. This bottom member 26 is provided with three or more locating pins 30 projecting upwardly into the annular groove 32. The intermediate interpole ring 24 has complementary locating recesses which fit over the pins 30 to properly locate the ring 24 in the groove 32. The ring 24 is of iron or steel having suitable magnetic properties for an electromagnet.

Figure 3:
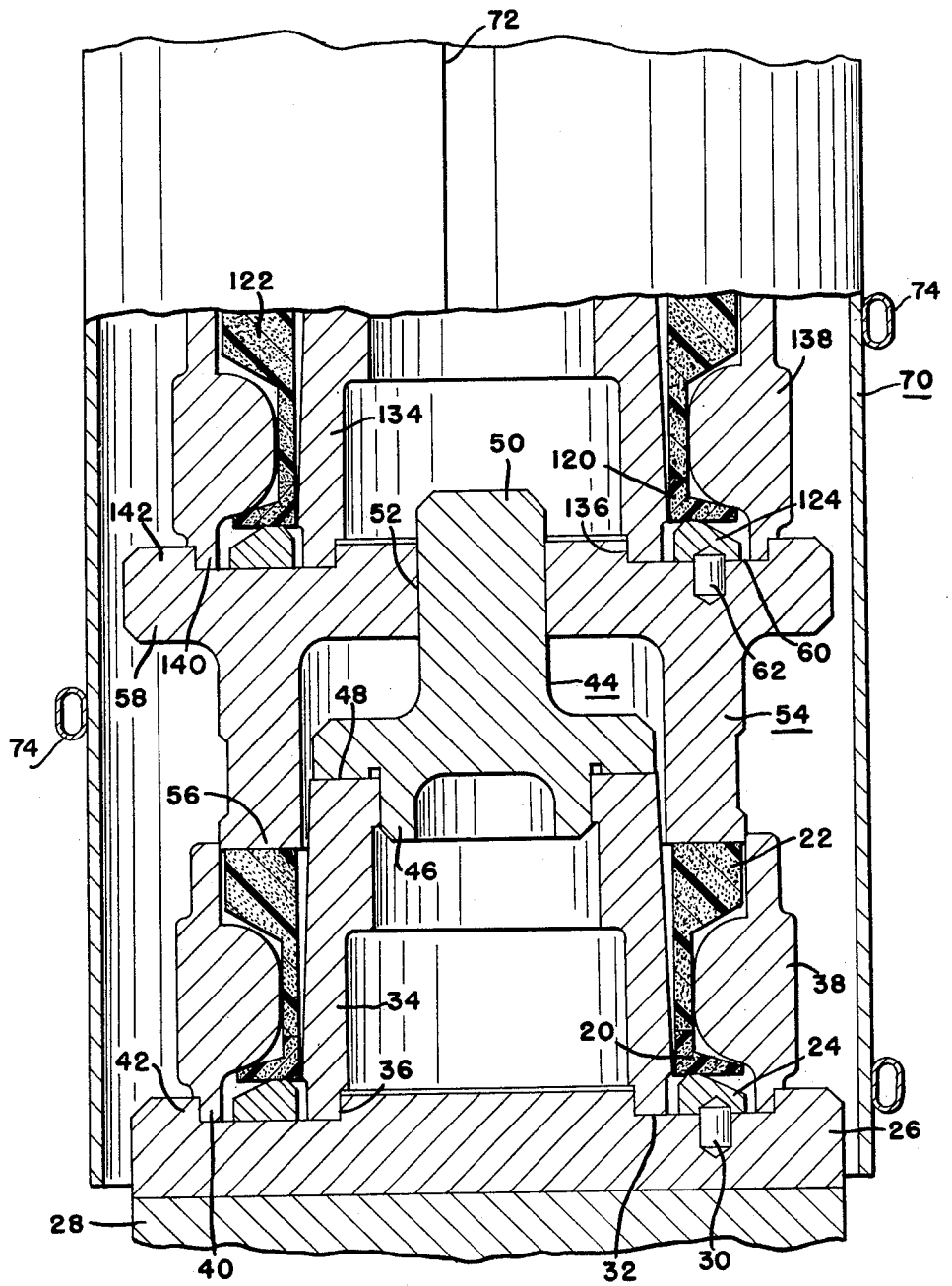
FIGURE 3 is a fragmentary vertical sectional view of the lower portion of the stack shown in FIGURE 1 prior to the application of heat and pressure.

Thereafter, the inner bearing member 34 is placed with its lower ring within the groove 32 abutting the central projection 36 forming a locating shoulder for holding the inner bearing member 34 concentric with the intermediate interpole ring 24. Thereafter, the plastic ring 20 is slipped over an inner bearing member onto the upper face of the intermediate interpole ring as shown in FIGURE 3. Thereafter the outer pulley rim 38 is placed around the rings 34 and 20 with its lower rim portion 40 fitting within the annular projection 42 upon the lower member 26 which is provided with an inner locating shoulder for holding the rim 38 concentric with the intermediate interpole ring 24 and the inner bearing ring 34. The plastic ring member 22 is then placed in between the inner bearing ring 34 and the outer ring or rim 38 as shown in FIGURE 3.

The locating fixture element 44 has a coaxial annular projection 46 which fits within the upper portion of the inner bearing ring 34. This locating fixture 44 also has an annular shoulder 48 which rests upon the upper surface of the inner bearing ring 34. This central locating fixture 44 has an upwardly extending coaxial projection 50 extending through an aperture 52 separately located within a complementary fixture 54. This complementary fixture 54 has a coaxial annular downwardly extending cylindrical rim 56 having its lower face fitting on top of the plastic ring 22 in between the outer rim 38 and the inner bearing ring 34 in a telescoping relation as shown in FIGURE 3. The upper portion of this complementary fixture 54 is in the form of a disk 58 containing the aperture 52 concentrically located and an annular groove 60 which is identical to the annular groove 32 in the bottom plate 26 and which is concentric with all the other members. This complementary fixture is also provided with three or more locating pins 62 symmetrically located which project upwardly into the groove 60 as shown in FIGURE 3. The intermediate interpole ring 124 is located in the groove 60 by the locating pins 62 which project into the symmetrically locating recesses provided in the ring 124. A second inner bearing ring 134 is located by the inner shoulder 136 of the groove 60 upon the complementary fixture 54. A plastic ring 120 identical to the ring 20 is then placed upon the ring 124 surrounding the inner bearing ring 134. A second outer rim 138 identical to the rim 38 has its lower face placed within the annular projection 142 upon the upper face of the fixture 54 with its downwardly extending projection extending within and held in concentric relationship by the inner shoulder of the annular projection 122 as shown in FIGURE 3. Thereafter, a second plastic ring 122 identical to the plastic ring 22 is placed between the inner bearing ring 134 and the outer rim 138 in contact with the upper face of the plastic ring 120.

The stack is built up by inserting a locating fixture provided with a projection 150 into the inner bearing ring 134 which is identical to the locating fixture 44 and by placing over this locating fixture another complementary fixture 154 identical with the fixture 54. The stack is built in this manner until it is as high as the hydraulic press can accommodate. At the section designated by 2—2 there is shown in section an outer rim 338 in FIGURE 2 within which is the upper portion of the plastic ring 222, similar to the ring 22. Inside of this is shown the inner bearing ring 234 corresponding to the ring 34 and the projecting portion 150 of the locating fixture beneath corresponding to the fixture 44. The top plate 66 of the welding machine is provided with a recess 68 which receives the projection 150 of the uppermost locating fixture.

Figure 2:
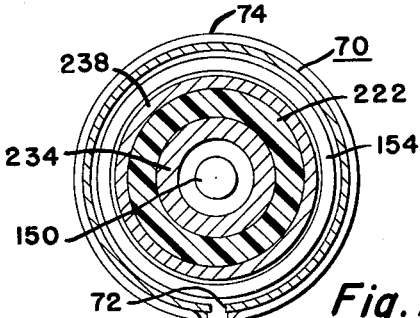
FIGURE 2 is a horizontal sectional view taken along lines 2—2 of FIGURE 1.

When the stack is properly located in the machine it is surrounded by a single turn induction coil 70 formed of a copper plate of about one-eighths thickness having a gap 72 formed in the ring as shown in FIGURE 2. This copper plate induction coil is provided with a water cooling coil 74 in the form of copper tubing soldered to the outside of the copper plate 70. One end 76 of the tubing 74 is connected to a water supply and the opposite end 78 is connected to a drain. The opposite edges of the copper plate induction coil 70 are connected by the conductors 80 and 82 to the current source which is provided with suitable controls and a transformer for this purpose. These are indicated diagrammatically by the current source 84 in FIGURE 2.

As the next step, the entire stack is preheated for twenty seconds inductively by the application of approximately thirty-five kilowatts of electrical energy at a frequency of 10,000 cycles per second to the induction heating coil 70. In the following twenty seconds, this heat is allowed to penetrate into the plastic ring members by shutting off the electrical energy to the induction coil 76 for twenty seconds. At the end of this second twenty second period heat is again applied to the induction heating coil 70 and at the same time, the piston rod 86 moves the plate 66 downwardly into contact with the upper face of the upper complementary fixture 454, and continues this movement until a total force of approximately fifty-five tons (unit force 18,000 lbs./sq. inch) is developed. The electrical induction heating at about thirty-five kilowatts at a frequency of 10,000 cycles per second is continued concurrently with the application of the pressure for one minute and thirty seconds. The pressure is continued for a total pressure period of three minutes and fifty seconds or two minutes and twenty seconds following the termination of the induction heating.

Figure 4:
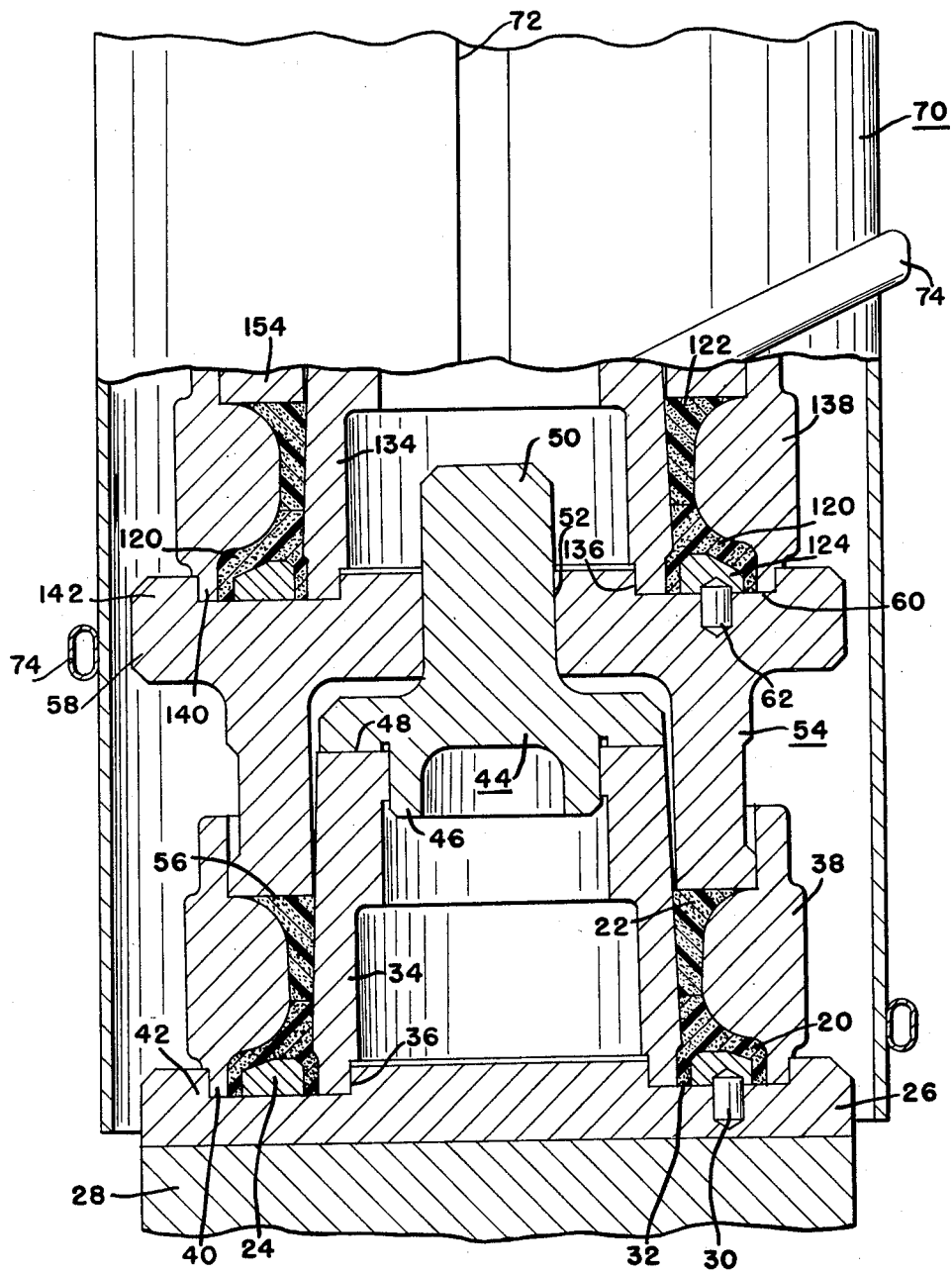
FIGURE 4 is a similar vertical sectional view of the stack shown following the completion of the application of heat and pressure.

This application of heat and pressure forces each of the lower plastic rings identical to the ring 20 around the adjacent intermediate interpole rings identical with the ring 24 until the plastic flows firmly into contact with the adjacent face of the groove corresponding to the groove 32. All of the grooves corresponding to the groove 32 are highly polished and provided with a mold release agent such as a soap solution. The plastic rings corresponding to the ring 20 bond to the rings corresponding to the ring 22 and the rings corresponding to the ring 34 as well as the rims corresponding to the rims 38 as shown in FIGURE 4. Also during this time, all the rings corresponding to the ring 22 are caused to flow downwardly and bond to the adjacent surface of the ring 20 as well as to the adjacent surfaces of the inner bearing ring 34 as well as the rims corresponding to the outer rim 38 as shown in FIGURE 4. The bottom faces of the complementary fixtures corresponding to the fixture 54 are also polished and provided with an anti-sticking compound, such as a soap solution.

The plastic material therefore is formed in between the rings 24, 34, and 38 and the corresponding rings as shown in FIGURE 4 during the application of heat and pressure. The plastic material bonds together the three metal parts and holds them separated so as to provide three magnetic poles at the downwardly turned faces. This provides a magnetically efficient clutch element which for example can be used as a clutch pulley by applying a belt to the periphery of the rim 38. For use as a gear, the rim 38 may be provided with gear teeth.

After the release of the pressure, the stack is removed from the machine and disassembled. The pulleys produced by this process are of uniformly high quality and of great strength and endurance. They are very efficient magnetically and the surface of plastic material between the intermediate interpole ring 24 and the adjacent faces of the inner bearing ring 34 and the outer rim 38 provide very good friction surfaces which have a long, effective life with uniform characteristics due to the presence of the aluminum oxide therein. The aluminum chips incorporated in the ring 22 provide good heat conduction between the inner bearing ring 34 and the outer ring 38 so as to dissipate any heat from the bearing so as to keep the bearing within the bearing ring 34 as cool as possible. The pulley is strong enough to withstand almost any conceivable destructive forces. After the pulleys are removed from the stack, they may be post cured by placing them in a furnace at 400° for four hours.

Figure 7:
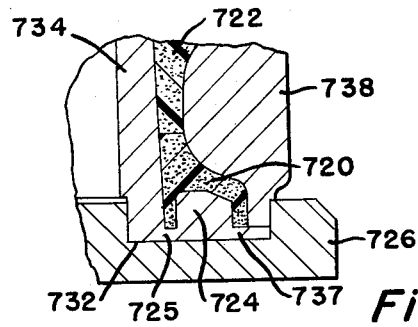
FIGURE 7 is a fragmentary vertical sectional view through a portion of the stack showing a modified form of the invention.

In FIGURE 7, there is illustrated a modified type form of the invention. In this form, the inner bearing ring 734 and the intermediate interpole ring 720 are connected by an integral web 725 and the intermediate interpole ring 724 and the outer rim 738 are similarly connected by an integral web 737. These integral webs 724 and 737 insure the concentric location of the intermediate interpole ring 724 relative to the inner bearing ring 734 and the outer rim 738 without the use of the locating pins 30. The plastic rings 720 and 722 corresponding to the rings 20 and 22 are heated and forced into place hydraulically between the rings 724 and 734 and the rim 738 in a manner similar to that illustrated in the first embodiment of the invention. The three rings are held in place within a groove 732 in a plate 726 in a manner similar to the first embodiment. The resulting pulley, after being post cured, then has the surface that is shown in the groove 732 in FIGURE 7 machined until the webs 725 and 737 are cut away to expose the plastic ring 720 on both sides of the intermediate interpole ring 724.

While the invention has been shown as applied specifically to a pulley composed of concentric metal rings and plastic rings, it is obvious that the process is applicable to other shapes particularly shapes containing endless bands of various configurations located one within the other.

What is claimed is as follows:

1. The process of multiple bonding of sets of inner and outer endless bands which includes locating two preformed plastic members of different composition and characteristics between the inner and outer bands of each set, locating a fixture axially between each set of inner and outer bands and between the plastic members associated with adjacent sets of bands and in telescoping relationship with the bands of one of the adjacent sets in contact with a plastic member associated with said one adjacent set, applying an axial force simultaneously to the endless bands and the fixture and the plastic members and concurrently inductively heating simultaneously the plastic members causing said members of each set to flow into contact with each other and fill the space between and extend firmly into contact with and bonding with the adjacent inner and outer bands to simultaneously form a plurality of sets of inner and outer bands united with plastic members.

2. The process of multiple bonding of sets of inner and outer endless bands which includes placing a first set of a plurality of preformed plastic members between a first set of inner and outer endless bands, placing a first fixture in contact with and in axial alignment with one of the members of said first set of plastic members and in telescoping relation with said first set of bands, placing a second set of inner and outer endless bands upon said first fixture, placing a second set of a plurality of preformed plastic members between said second set of inner and outer endless bands, placing a second fixture in contact with and in axial alignment with one of the members of said second set of plastic members, applying an axial force simultaneously to the endless bands and the fixtures and the plastic members and concurrently simultaneously inductively heating the plastic members causing said members to flow and fill the space between and extend firmly into contact with and bonding with the adjacent inner and outer bands to simultaneously form a plurality of united units.

3. The process of bonding inner and outer endless bands which includes placing a first preformed plastic member substantially rigid at outdoor temperatures in between the inner and outer endless bands adjacent one edge thereof, placing a second preformed plastic member of different composition than the first plastic member in between the inner and outer endless bands adjacent the opposite edge thereof, heating the two plastic members and applying to the exposed face of one of the plastic members a high force to cause said first plastic member to flow firmly into contact with the second plastic member and to force each of the plastic members firmly into contact with the inner and outer endless bands.

4. The process of bonding outer and inner and intermediate endless bands which includes holding the intermediate endless band in spaced relation with and between the inner and outer bands, placing a first preformed plastic member in between the inner and outer bands adjacent the intermediate band, placing a second preformed plastic member of different composition than the first plastic member in between the inner and outer bands, heating the two plastic members and applying to one of the plastic members a high force sufficient to cause one of the plastic members to flow around the intermediate band and firmly into contact with the outer and inner bands and to cause the other plastic member to flow into contact with said one plastic member and the outer and inner bands.

References Cited in the file of this patent

UNITED STATES PATENTS

| | | |
|---|---|---|
| 997,498 | Headson | July 11, 1911 |
| 1,348,669 | Talbot | Aug. 3, 1920 |
| 1,465,545 | Demongeot | Aug. 21, 1923 |
| 1,477,025 | Atwood | Dec. 11, 1923 |
| 1,605,356 | Leipert | Nov. 2, 1926 |
| 1,952,811 | Lytle | Mar. 27, 1934 |
| 2,135,380 | Benge | Nov. 1, 1938 |
| 2,162,890 | Horne et al. | June 30, 1939 |
| 2,169,281 | Pfanstiehl | Aug. 15, 1939 |
| 2,179,261 | Keller | Nov. 7, 1939 |
| 2,341,272 | Firth et al. | Feb. 8, 1944 |
| 2,351,329 | Gerstenmaier | June 13, 1944 |
| 2,352,474 | Firth et al. | June 27, 1944 |
| 2,358,259 | Siedschlag et al. | Sept. 12, 1944 |
| 2,409,645 | Sawyer | Oct. 22, 1946 |
| 2,724,864 | Krotz | Nov. 29, 1955 |
| 2,809,399 | Mead et al. | Oct. 15, 1957 |

FOREIGN PATENTS

| | | |
|---|---|---|
| 845,037 | Great Britain | Aug. 17, 1960 |